United States Patent [19]

Cunningham et al.

[11] Patent Number: 5,529,719

[45] Date of Patent: Jun. 25, 1996

[54] PROCESS FOR PREPARATION OF CONDUCTIVE POLYMERIC COMPOSITE PARTICLES

[75] Inventors: Michael F. Cunningham, Georgetown; Thomas E. Enright, Whitby; Hadi K. Mahabadi, Etobicoke, all of Canada

[73] Assignee: Xerox Corporation, Stamford, Conn.

[21] Appl. No.: 411,189

[22] Filed: Mar. 27, 1995

[51] Int. Cl.[6] .............................. G03G 5/00; G03G 9/10; C08F 2/14; C08F 2/32

[52] U.S. Cl. .......................... 252/511; 252/500; 252/502; 252/510; 252/512; 252/513; 252/518; 252/520; 252/519; 252/506; 252/507; 252/503; 252/521; 252/509; 430/137; 430/108

[58] Field of Search ................................ 252/511, 500, 252/502, 510, 512, 513, 518, 520, 519, 506, 507, 503, 521, 509; 524/779, 783, 784, 785, 847; 430/137, 108; 523/215, 200, 201, 205; 428/402, 922, 407

[56] References Cited

U.S. PATENT DOCUMENTS

| | | | |
|---|---|---|---|
| 3,505,434 | 4/1970 | Battaerd et al. | 264/15 |
| 3,844,816 | 10/1974 | Vassiliades et al. | 252/316 X |
| 4,113,917 | 9/1978 | Tugukuni et al. | 428/407 |
| 4,299,903 | 11/1981 | AuClair et al. | 430/137 |
| 4,562,136 | 12/1985 | Inoue et al. | 430/107 |
| 4,590,141 | 5/1986 | Aoki et al. | 430/108 |
| 4,727,011 | 2/1988 | Mahabadi et al. | 430/138 |
| 4,833,060 | 5/1989 | Nair et al. | 430/137 |
| 4,908,665 | 3/1990 | Takeda et al. | 355/245 |
| 4,912,005 | 3/1990 | Goodman et al. | 430/108 |
| 4,954,567 | 9/1990 | Oishi et al. | 525/62 |
| 5,043,404 | 8/1991 | Mahabadi et al. | 526/194 |
| 5,045,611 | 9/1991 | McNeil | 526/81 |
| 5,114,824 | 5/1992 | Tan et al. | 430/137 |
| 5,133,992 | 7/1992 | Nair et al. | 428/407 X |
| 5,153,092 | 10/1992 | Kao et al. | 430/137 |
| 5,215,847 | 6/1993 | Patel et al. | 430/137 X |
| 5,229,242 | 7/1993 | Mahabadi et al. | 430/110 X |
| 5,236,629 | 8/1993 | Mahabadi et al. | 252/511 |
| 5,288,807 | 2/1994 | Hinz | 524/785 X |
| 5,322,912 | 6/1994 | Georges et al. | 528/204 |
| 5,334,479 | 8/1994 | Chen | 430/137 |
| 5,342,724 | 8/1994 | Wilson | 430/110 X |
| 5,474,870 | 12/1995 | Yamazaki et al. | 430/137 X |
| 5,487,847 | 1/1996 | Mahabadi et al. | 252/511 |

OTHER PUBLICATIONS

*Encyclopedia of Polymer Science and Engineering*, John Wiley & Sons, 1985, vol. 2, pp. 500–502.

*Encyclopedia of Polymer Science and Engineering*, John Wiley & Sons, 1988, vol. 13, pp. 762–767.

Li, Fumian, et al., "Synthesis and polymerization of 2-hydroxy-3-dialkylaminopropyl methacrylates", *Gaofenzi Tongxun*, 6 (1981), 454–460 (Chem. Abs. 97:145317).

Ulbricht, J., et al., "Polymerization of vinyl chloride with redox systems at low temperatures", *Plaste Kaut.*, 21(6) (1974), 410–414 (Chem. Abs. 81:106075).

Ulbricht, J., et al., "Copolymers of vinyl chloride with dialkyl maleates", *Plaste Kaut.*, 20(5) (1973), 323–327 (Chem. Abs. 79:92648).

Bartlett, Paul D., et al., "The Decomposition of Benzoyl Peroxide in Solvents", *J. Am. Chem. Soc.*, 69 (Oct. 1947), 2299–2306.

*Primary Examiner*—Douglas J. McGinty
*Attorney, Agent, or Firm*—E. D. Palazzo

[57] ABSTRACT

A process for the preparation of polymer which comprises effecting a bulk polymerization of a mixture containing at least one monomer, a chain transfer agent, a crosslinking agent, a free radical redox polymerization initiator pair, and at least one additional free radical initiator until from about 4 to about 50 weight percent of the monomer has been polymerized and one or both components in the redox initiator pair has been consumed; dispersing with a high shear mixer the aforementioned partially polymerized mixture in water containing a stabilizing component selected from the group consisting of nonionic and ionic water soluble polymeric stabilizers to obtain a suspension of particles; polymerizing the resulting suspension; and optionally subsequently insulating, washing and drying the polymer product.

28 Claims, 2 Drawing Sheets

PROCESS FOR PREPARATION OF CONDUCTIVE POLYMERIC COMPOSITE PARTICLES

BACKGROUND OF THE INVENTION

This invention is generally directed to conductive composite particles and processes for the preparation thereof, and more specifically, the present invention relates to the preparation of small conductive polymeric composite particles of, for example, from about 0.05 to about 5 and preferably from about 0.1 to about 1 micron in diameter, each comprising a polymer and a conductive filler distributed, preferably evenly throughout the polymer matrix of the particle composite comprised of polymer and conductive filler. The present invention also relates to processes for the preparation of polymeric composite particles by a modified bulk polymerization process. In embodiments, the process of the present invention comprises the preparation of conductive polymeric particles optionally containing a conductive filler in an amount of from about 1 to about 50 and preferably from about 5 to about 20 weight percent distributed substantially throughout the polymer matrix of the particles, and which particles can be selected as carrier powder coatings, and wherein the carriers can be selected for xerographic imaging and printing processes. In embodiments, the process of the present invention comprises the preparation of conductive polymeric composite particles with an average volume particle size diameter of from between about 0.05 micron to about 5 microns. The conductivity of the generated submicron polymeric composite particles can be modified by, for example, varying the weight percent of conductive filler component present in effective amounts of preferably, for example, from between about 5 to about 20 weight percent, and also by varying the composition of the conductive filler component. Thus, in embodiments conductive submicron polymeric composite particles with a conductivity of from between about $10^{-10}$ (ohm-cm)$^{-1}$ to about $10^{-1}$ (ohm-cm)$^{-1}$ can be prepared. In embodiments, the particles with an average volume diameter of from about 0.05 to about 5 microns are comprised of polymer and a conductive filler or additive like carbon black distributed evenly throughout the polymer matrix of the composite product, and which product can be obtained by a semisuspension polymerization method using a modified bulk polymerization in which at least one monomer is mixed with a conductive filler, a redox initiator pair comprising an oxidizing agent, such as a free radical initiator, and a suitable reducing agent, one or more other free radical initiator polymerization initiators, and optionally a chain transfer component; effecting bulk polymerization by heating until from about 4 to about 50 weight percent of the monomer has been polymerized and one or both components of the redox initiator pair have been consumed; dispersing the resulting mixture in water containing a stabilizing component to obtain a suspension of particles with an average diameter of from about 0.05 to about 5 microns in water; polymerizing the resulting suspension by heating; and optionally subsequently washing and drying the polymer product; and wherein the aforementioned bulk polymerization is accomplished at about room temperature, or a temperature of from about zero to about 70° C. Optionally, the conductive filler can be added at the end of the bulk polymerization and mixed into the organic phase using, for example, a high shear mixer.

Metals, such as carrier cores, are conductive or semiconductive materials, and the polymeric materials used to coat the surface of metals are usually insulating. Therefore, carrier particles coated completely with polymer or a mixture of polymers can lose their conductivity and become insulating. Although this is desired for some applications, such as for conductive magnetic brush systems (CMB), the carrier particles should be conductive. Since the carrier polymer coating can be utilized to control carrier tribo, a conductive carrier coating is needed to design carriers with the desired conductivity and triboelectrical properties. Conductive polymers are very costly, and are not considered suitable for preparing low cost, for example less than $5/pound, coating, thus a conductive polymer composite comprising a low cost polymer and a conductive filler, such as conductive carbon black, is considered a more suitable alternative.

A polymer composite coating of metal materials, such as carrier beads, is known and can generally be obtained by two general approaches, solution and powder coating. Solution coating of carriers with a polymer composite solution comprised of a polymer, a conductive filler and solvent can be utilized to prepare conductive carrier, however, trapping of solvent in the solution coating can adversely interfere with the use of coated materials, for example the residual solvent trapped in the carrier coating reduces the carrier life, and the release of solvent in the developer housing can cause other problems related to the harmful effects of absorbed solvent to various copying machine parts and the toxicity of solvent. Moreover, the solvent recovery operation involved in the solution coating processes is costly. The powder coating of metal surfaces can eliminate the need for solvent, and therefore, many of the problems associated with solution coating; however, it requires a polymer powder with a very small size, for example less than 1 to 5 microns. Although polymer powders are available for carrier powder coating, submicron or micron-sized polymer composite particles containing conductive filler to prepare conductive coated carriers that maintain their triboelectrical characteristics for extended time periods exceeding, for example, 200,000 images, and which possess the other advantages illustrated herein are desired.

In copending application U.S. Ser. No. 225,855, now U.S. Pat. No. 5,487,847, the disclosure of which is totally incorporated herein by reference, there is illustrated a process for the preparation of conductive polymeric particles with linear and crosslinked portions, which comprises mixing a monomer with at least one conductive filler, solvent, at least one polymerization initiator, and a chain transfer component; effecting solution polymerization by heating until from about 80 to about 100 weight percent of the monomer has been polymerized; drying the mixture by removing the solvent to yield an intimate blend of polymer with conductive filler; dispersing the aforementioned blend of polymer and conductive filler in at least one monomer with at least one polymerization initiator, a crosslinking agent and a chain transfer agent to form an organic phase; dispersing the resulting organic phase mixture in water containing a stabilizing component to obtain a suspension of particles with an average volume diameter of from about 0.05 to about 5 microns in water; polymerizing the resulting suspension by heating; and subsequently optionally washing and drying the polymeric product. The invention of the present application in embodiments eliminates the need, for example, to conduct the solution polymerization and subsequently remove the solvent such as toluene. The invention of the present application offers an economical process requiring less process time, less capital investment and lower processing costs as compared to the process disclosed in the above mentioned copending application.

Figure 1:
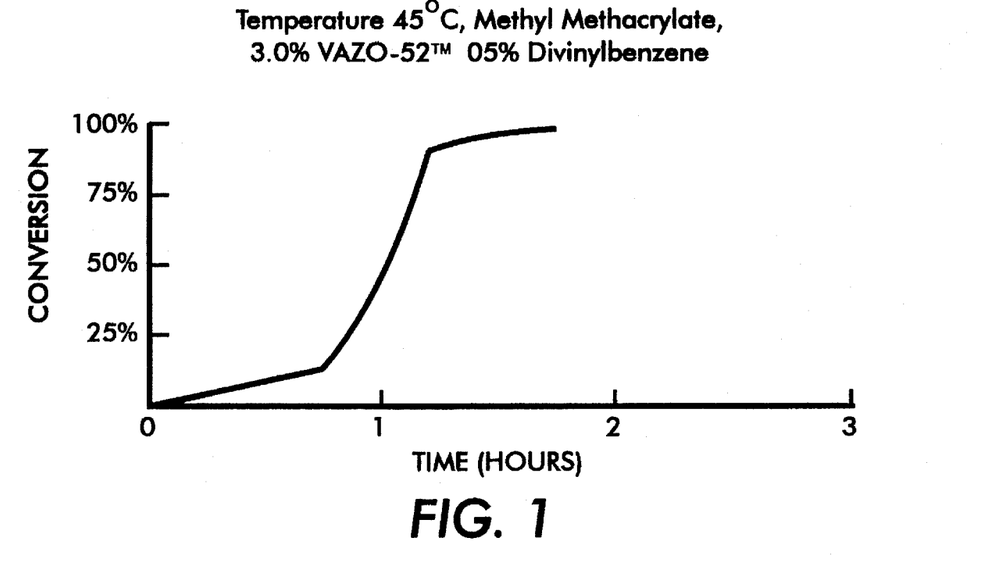

Semisuspension polymerization processes are known, reference U.S. Pat. No. 5,236,629, the disclosure of which is totally incorporated herein by reference. The '629 patent describes a process for the preparation of conductive submicron polymeric particles, which comprises mixing at least one monomer with a polymerization initiator, a crosslinking component and a chain transfer component; effecting bulk polymerization until from about 10 to about 50 weight percent of the monomer has been polymerized; terminating polymerization by cooling the partially polymerized monomer; adding thereto from about 1 to about 50 weight percent of a conductive filler, or conductive fillers, followed by mixing thereof; dispersing the aforementioned mixture of conductive filler or fillers, and partially polymerized product in water containing a stabilizing component to obtain a suspension of particles with an average diameter of from about 0.05 to about 1 micron in water; polymerizing the resulting suspension by heating; and subsequently washing and drying the product. It is indicated in the '629 patent that the viscosity of the organic phase at the end of the bulk polymerization is important in determining the final particle size and also in determining the quality of the pigment or carbon black dispersion in the particles. It is, therefore, important to have good control of the conversion at the end of the bulk polymerization to ensure a reproducible process. While it is difficult to establish adequate control of a bulk polymerization of monomers in the absence of conductive additives, it is much more difficult to control the conversion in the bulk polymerization when conductive additives are present since many of these materials, for example carbon blacks, are known to contain functional surface groups that act as polymerization inhibitors. When conducting a bulk polymerization with such inhibitors present, there is a greater variability in the polymerization rate than in the absence of these materials and consequently process reproducibility is lower. Consequently, there exists a need for a process that allows a reproducible process to be achieved during bulk polymerization, particularly in the presence of conductive additives. The invention of the present application in embodiments selects a free radical redox initiator system selected to provide low temperature reaction conditions, where low temperature refers to the range of from about 0° to about 70° C., and more preferably from about 0° to about 30° C., a reproducible conversion in the bulk polymerization of from about 4 to about 50 percent, which can be varied by controlling the ratio of the redox initiator pair by, for example, varying the ratio of benzoyl peroxide to dimethylaniline. With conventional bulk polymerization processes the monomer conversion increases with time as illustrated, for example, in FIG. 1.

Figure 2:
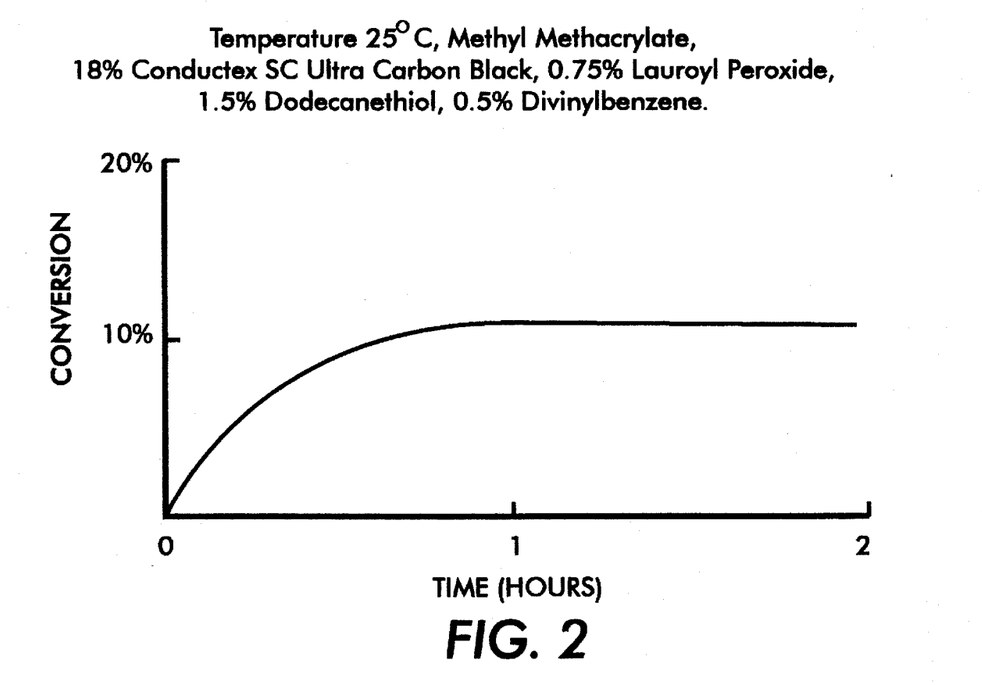

The kinetics of the bulk polymerization of the present invention are illustrated in FIG. 2.

Figure 3:
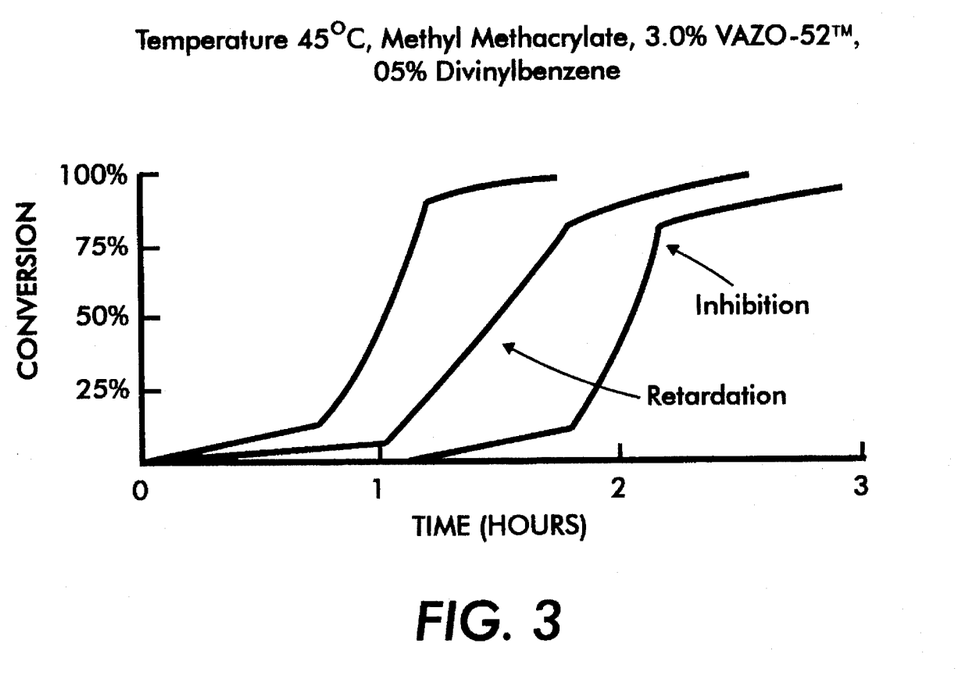
FIG. 3 illustrates the conversion versus time curve for a conventional bulk polymerization with inhibition and retardation.

In conventional bulk polymerization, the conversion increases approximately linearly with time until the onset of the gel effect at which point it increases rapidly. Achieving a reproducible process requires that the polymerization be terminated at almost exactly the same time, and that the polymerization kinetics be identical each process run. However, in the presence of conductive additives containing functional groups that act as inhibitors or retarders, the kinetics will usually vary from FIG. 3.

Consequently, there will be large, that is for example the standard deviation of the conversion will exceed for instance 0.02, variation in the conversion at the end of the bulk polymerization. The invention herein eliminates this difficulty by establishing kinetics in which the conversion increases to a certain value and then stops increasing (FIG. 2). In this process, there is no need to terminate the bulk polymerization at a specific time to achieve a desired conversion. The same desired conversion is achieved whenever the process is operated by allowing the bulk polymerization to function for a sufficiently long period of time, for example from about 1 to about 3 hours. Other advantages of the modified bulk polymerization processes of the present invention include elimination of an uncontrolled exothermic reaction. An uncontrolled exothermic reaction could result in a conventional bulk process if, for example, there was a loss of cooling to the reactor or if mixing was terminated leading to reduced heat transfer. These conditions would not cause an uncontrolled exothermic reaction with the modified bulk polymerization process since, for example, the redox initiator system is chosen to active at lower temperature and to be consumed at the end of the bulk polymerization. Once the desired conversion level is reached, the redox initiator system has been consumed, and therefore, further polymerization can only proceed when the mixture has been heated to a higher temperature to activate the conventional free radical initiators. A further advantage of this invention is a reduction of the formation of free conductive filler particles contaminating the product. Free conductive filler particles arise when the conversion at the end of the bulk polymerization is too low and the conductive filler particles then diffuse out of the polymerizing polymer particle during the suspension polymerization step.

The redox initiator pair system of the present invention comprises an oxidizing agent which is also a free radical initiator, for example a peroxide, and a suitable reducing agent, for example dimethylaniline. The reducing agent could also be an additive, such as carbon black, containing surface groups that act as reducing agents. By varying the ratio of benzoyl peroxide to dimethylaniline, the limiting conversion of a methyl methacrylate polymerization can be varied from, for example, 0.04 to 0.5; and also the ratio and concentration of the oxidizing and reducing agents forming the redox initiator pair permits the conversion at the end of the bulk polymerization to be controlled.

The preparation of polymeric particles for powder coatings can be accomplished, for example, by three methods, namely grinding or attrition, precipitation and in situ particle polymerization. Grinding or attrition, especially fluid energy milling, of large polymeric particles or polymeric composite particles containing fillers to the size needed for powder coating, for example less than 1 to 5 microns, is often not desirable both from an economic and functional viewpoint. These materials are difficult to grind and, therefore, grinding or attrition of required materials for coating with present milling equipment is very costly due to very low processing yield, for example in the range of 5 to 10 weight percent. Precipitation process can also be used to prepare polymeric/polymeric composite particles. In one process, the polymer solution is heated to above its melting temperature and then cooled to form particles. In another process, the polymer solution is precipitated using a nonsolvent or the polymer solution is spray dried to obtain polymeric/polymeric composite particles. With these precipitation processes, it has been difficult to achieve low cost, pure polymer, that is, for example, with no or substantially no impurities such as solvents or precipitants in the resulting polymer particles. It is also difficult to obtain particles with small particle size and narrow particle size distribution. Further, it can be difficult to control filler distribution throughout each particle's polymer matrix. In the in situ particle polymerization process, polymer particles are prepared by suspension dispersion, emulsion and semisuspension polymerization. Suspension polymerization can be utilized to prepare polymer particles and polymeric composite particles containing, for example, a conductive filler. However, this process does not, for example, effectively enable particles with a size of less than 5 microns. Although emulsion and dispersion polymerization can be utilized to prepare polymeric particles of a small size, for example less than 5 microns, these processes wherein particle formation is achieved by nucleation and growth do not, it is believed, enable synthesis of particles containing fillers such as conductive fillers.

There is disclosed in U.S. Pat. No. 4,908,665 a developing roller or developer carrier comprised of a core shaft, a rubber layer and a resin coating layer on the surface of the rubber containing conductive fillers for a one component developer. It is indicated in the '665 patent that a conductive developing roller can eliminate variation of the image characteristic due to the absorption of moisture for one component development. This patent thus describes a developing roller for one component developer. U.S. Pat. No. 4,590,141 discloses carrier particles for two component developer coated with a layer of silicon polymer using fluidized bed solution coating. U.S. Pat. No. 4,562,136 discloses a two component dry type developer of carrier particles coated with a silicon resin containing a monoazo metal complex charging. The two component carriers described in the above two patents are insulating and are not believed to be conductive. There is disclosed in U.S. Pat. No. 4,912,005 a conductive carrier composition coated with a layer of resin containing a conductive particle by solution coating. Residual solvent trapped in the aforementioned coated layer adversely effects the maintainability of carrier electrical properties for an extended time period.

There is disclosed in U.S. Pat. No. 3,505,434 a process wherein particles for fluidized bed powder coating are prepared by dispersing the polymer in a liquid, which is heated to above the polymer melting point and stirred causing the polymer particles to form. The particles are then cooled below their melting point and recovered. However, this process does not, for example, enable particles with a size of below 50 microns in average volume diameter.

Also, the suspension polymerization of monomer is known for the formation of polymer/polymeric composite particles generally in a size range of about 200 microns and higher. The main advantage of suspension polymerization is that the product may easily be recovered, therefore, such a process is considered economical. However, it is very difficult by suspension polymerization to prepare very small particles as the monomer droplets tend to coalesce during the polymerization process, especially in the initial stage of polymerization where the droplets are very sticky. For example, there is disclosed in U.S. Pat. No. 3,243,419 a method of suspension polymerization wherein a suspending agent is generated during the suspension polymerization to aid in the coalescence of the particles. Also, disclosed in U.S. Pat. No. 4,071,670 is a method of suspension polymerization wherein the monomer initiator mixture is dispersed in water containing stabilizer by a high shear homogenizer, followed by polymerization of suspended monomer droplets.

Disclosed in U.S. Pat. No. 4,835,084 is a method for preparing pigmented particles wherein high concentration of silica powder is used in the aqueous phase to prevent coalescence of the particles. There is also disclosed in U.S. Pat. No. 4,833,060 a process for the preparation of pigmented particles by dissolving polymer in monomer and dispersing in the aqueous phase containing silica powder to prevent coalescence of the particles. However, the silica powder used in both U.S. Pat. Nos. '084 and '060 should be removed using KOH, which is costly, and residual KOH and silica materials remaining on the surface adversely affects the charging properties of particles. There is also disclosed in U.S. Pat. No. 3,954,898 a two step polymerization process for the preparation of a thermosetting finished powder. However, this process does not enable synthesis of particles with a size less than about 100 microns.

As a result of a patentability search for U.S. Pat. No. 5,043,404, there were located U.S. Patents 4,486,559, which discloses the incorporation of a prepolymer into a monomer toner mix followed by emulsion polymerization; 4,680,200 and 4,702,988, which illustrate emulsion polymerization. It is known that submicron polymeric particles can be synthesized by emulsion polymerization. However, synthesis of submicron polymeric particles by emulsion polymerization requires a high concentration of emulsifier which remains in the final product and renders it humidity sensitive. Therefore, emulsion polymerization does not enable preparation of clean submicron polymeric particles which are insensitive to humidity. Moreover, in emulsion polymerization particle formation is controlled by diffusion of monomer from monomer droplet through a water phase into the growing particles. This mechanism, which is characteristic of emulsion polymerization, does not allow inclusion of conductive fillers in the polymeric particles. Furthermore, it is known that the addition of conductive fillers into emulsion, dispersion or suspension polymerization systems causes severe inhibition which stops or reduces the rate of polymerization significantly.

Disclosed in the aforementioned U.S. Pat. No. 5,043,404, the disclosure of which is totally incorporated herein by reference, is a semisuspension polymerization process for the preparation of small polymeric particles which are comprised of a mixture of monomer or comonomers, a polymerization initiator, a crosslinking component and a chain transfer component which are bulk polymerized until partial polymerization is accomplished. The resulting partially polymerized monomer or comonomers is dispersed in water containing a stabilizer component with, for example, a high shear mixer, then the resulting suspension polymerized, followed by washing and drying the submicron polymeric particles. U.S. Pat. No. 5,236,629 discloses a process for the preparation of conductive submicron polymeric particles which comprises mixing at least one monomer with a polymerization initiator, a crosslinking component and a chain transfer component; effecting bulk polymerization until from about 10 to about 50 weight percent of the monomer has been polymerized; terminating polymerization by cooling the partially polymerized monomer; adding thereto from about 1 to about 50 weight percent of a conductive filler, or conductive fillers, followed by mixing thereof; dispersing the aforementioned mixture of conductive filler or fillers, and partially polymerized product in water containing a stabilizing component to obtain a suspension of particles with an average diameter of from about 0.05 to about 1 micron in water; polymerizing the resulting suspension by heating; and subsequently washing and drying the product.

The modified bulk semisuspension polymerization process described in the present application offers a different process with significant improvements over the process disclosed in U.S. Pat. No. 5,236,629. These advantages include (1) superior process reproducibility of the bulk polymerization step, which in turn leads to superior and improved control of the final product particle size and conductive filler dispersion; (2) an inherently safer process with a minimal risk of a runaway exothermic reaction occurring during the bulk polymerization; and (3) fewer potential problems with free conductive filler particles (caused by low conversion during the bulk polymerization step) contaminating the final product and causing, for example, problems with contamination in the developer housing when the particles are coated on carrier cores. The modified bulk semisuspension polymerization processes of the present invention permit the preparation of low cost, clean, and dry submicron conductive polymeric particles that can be selected as carrier powder coatings.

FIGURES

Illustrated in FIGS. 1 and 2 are Graphs 1 and 2 providing the conversion versus time curve for a conventional bulk polymerization, and conversion versus time curve for the modified bulk polymerization process.

SUMMARY OF THE INVENTION

It is, therefore, an object of this invention to provide conductive small polymeric composite particles and processes thereof with many of the advantages illustrated herein.

In another object of the present invention there are provided small conductive submicron polymeric composites comprised of a polymer and a conductive filler distributed evenly, and in embodiments uniformly throughout the polymer matrix of the composite and processes for the preparation thereof by a semisuspension polymerization process with modified bulk polymerization.

In yet another object of the present invention there are provided low cost, clean and dry conductive small polymeric composite particles comprised of from about 50 to about 99 weight percent of polymer and from about 1 to about 50 weight percent of conductive filler distributed throughout the polymer matrix of the composite as measured by TEM, and modified bulk semisuspension polymerization processes for the preparation thereof.

Another object of the present invention resides in conductive submicron polymeric composite particles with a conductivity of from about $10^{-10}$ (ohm-cm)$^{-1}$ to about $10^{-1}$ (ohm-cm)$^{-1}$ and preferably from about $10^{-4}$ (ohm-cm)$^{-1}$ to about $10^{-1}$ (ohm-cm)$^{-1}$ and processes for the preparation thereof.

Another object of the present invention resides in conductive submicron polymeric composite particles with an average particle diameter size of from about 0.05 micron to about 5 microns.

In another object of the present invention there are provided conductive small polymeric composites which can be selected for two component carrier powder coatings, reference U.S. Pat. Nos. 4,937,166 and 4,935,326, the disclosures of which are totally incorporated herein by reference, and processes for preparing such carriers; and wherein improved dispersion of conductive fillers can be achieved in submicron conductive carrier coating polymeric composite particles.

In another object of the present invention there are provided simple processes for the formation of small conductive polymeric particles, and more specifically, from about 1 to about 5 micron size (average volume throughout unless otherwise intended) conductive polymeric particles.

Also, in another object of the present invention there are provided simple and economical processes for the formation of conductive submicron polymeric particles that can be selected as carrier coatings, reference U.S. Pat. Nos. 4,937, 166 and 4,935,326, the disclosures of which are totally incorporated herein by reference.

Another object of the present invention resides in simple and economical modified bulk semisuspension polymerization processes for the preparation of low cost, clean, and dry small conductive polymeric particles, and more specifically, submicron or micron-size conductive polymeric particles useful as carrier powder coatings, and wherein carbon black can initiate decomposition of the peroxide initiator thereby permitting polyermization to occur to about 4 to 20 percent in about 2 to 4 hours.

Additionally, in another object of the present invention there are provided as a result of the enhanced degree of control and flexibility processes for the preparation of polymeric particles containing a conductive filler, or fillers with improved flow and fusing properties; and particles that can be selected for conductive carrier powder coatings with a triboelectric charge in the range, for example, of from about −40 to about +40 microcoulombs per gram as determined by the known Faraday Cage process.

These and other objects of the present invention can be accomplished in embodiments by the provision of processes for the preparation of small conductive polymer particles, each containing a conductive filler or fillers distributed throughout the polymer matrix of the product particles referred to as modified bulk polymerization processes in which at least one monomer is mixed with a carbon black, or a metal oxide like tin oxide, a free radical redox initiator pair, one or more polymerization initiators, and optionally a chain transfer component and/or a crosslinking component; effecting bulk polymerization by heating at low temperature of, for example, from about 0° to about 70° C., and preferably from about 0 to about 30° C. until from about 4 to about 50 weight percent of the monomer has been polymerized and one or both components of the redox initiator pair have been consumed. The viscosity of the organic phase can in embodiments be an important factor in controlling dispersion of the conductive filler in the particles, and which viscosity can be adjusted by the percentage of polymer in the mixture. Typical viscosities are in the range of from about 10 centipoises to 100,000 centipoises. Optionally, the conductive filler can be added after the bulk polymerization. The aforementioned mixture is then dispersed in water containing a stabilizing component with, for example, a high shear mixer to permit the formation of a suspension containing small, less than about 10 microns, and more specifically, from about submicron to about 5 microns, for example, particles therein, and thereafter, transferring the resulting suspension product to a reactor, followed by polymerization until complete conversion to the polymer product is achieved. The polymer product can then be cooled, washed and dried. More specifically, the process of the present invention is comprised of (1) mixing a monomer or comonomers with one or more conductive fillers, optionally with chain transfer and/or crosslinking components, a redox initiator pair, and polymerization initiators; (2) effecting bulk polymerization at low temperature, 0° to 70° C., and more preferably from 0° to 30° C. until from about 4 to about 50 weight percent of monomer or comonomers has been polymerized and one or both of the redox initiator pair has been consumed, to provide an organic phase; the molecular weight and concentration of polymer in this organic phase affects the viscosity of the organic phase which is an important factor in controlling the conductive filler distribution in the particles; (3) dispersing the organic phase in from about 2 to about 5 times its volume of water containing from about 1 to about 5 weight percent of a stabilizing component to form a suspension with a particle size diameter of from about 0.05 micron to about 5 micron particles containing from about 1 to about 50 weight percent of a conductive filler, or conductive fillers using a high shear mixer; (4) transferring the resulting suspension to a reactor and polymerizing the suspension by increasing its temperature to from about 45° C. to about 120° C. to allow the complete conversion of monomer or comonomers to polymer; (5) cooling the product and washing the product with water and/or an aliphatic alcohol like methanol; (6) separating polymer particles from the water/methanol by means of filtration or centrifugation; and (7) drying the polymeric particles. Optionally, the conductive filler can be added to the organic phase after the bulk polymerization is complete.

The processes of the present invention in embodiments are designed for the polymerization of monomers in the presence of a conductive component like carbon black and wherein the free radical polymerization initiators, primarily peroxides, undergo induced decomposition, that is they partially, for example from 40 to about 90 percent, or completely decompose, to release free radicals at a lower temperature, for example 0° to 70° C. and more preferably 0° to 30° C., than their usual thermal decomposition temperatures of, for example, 70° to 130° C. Of importance with respect to the processes of the present invention is that the aforementioned induced decomposition enables the bulk polymerization to be accomplished at from about 0° C. to about 30° C., and the fractional conversion of monomer to polymer does not continuously increase with time and reaches a substantial plateau at about 0.04 to about 0.50 after a short time, for example from about 1 to 2 hours.

The present invention is directed to the preparation of small conductive polymeric particles, or polymer product comprised of polymer and filler like carbon black contained therein and/or thereon, that is with, for example, an average particle diameter in the range of from about 0.05 micron to about 5 microns, and preferably from about 0.1 to about 1.0 micron as measured by SEM containing 1 to about 50 percent and preferably 10 to 20 percent of conductive filler distributed throughout the polymer matrix of particles, and which polymer particles have a number and weight average molecular weight of from between about 3,000 to about 500,000 and from between about 5,000 to about 2,000,000, as determined by gel permeation chromatography, respectively, in embodiments.

Further, the process of the present invention is directed to the preparation of conductive polymeric particles of average diameter of from about 0.1 micron to about 1.0 micron containing 10 to 20 weight percent of a conductive filter and 80 to 90 weight percent of a polymeric material. The polymeric material can be comprised of linear and crosslinked portions with a number average molecular weight of the linear portion being from about 3,000 to about 50,000 and a weight average molecular weight of from about 100,000 to about 500,000 and from 0.1 to about 25 weight percent of a crosslinked portion, and which polymer product is useful for carrier coatings. More specifically, the process of the present invention in embodiments is directed to the preparation of conductive polymeric particles of an average diameter in the range of between about 0.1 to about 1.0 micron, conductive filler distributed evenly throughout the polymer matrix particle as measured by TEM with a linear portion having a number average molecular weight in the range of from about 3,000 to about 50,000, and a weight average molecular weight of from about 100,000 to about 500,000 and from about 0.1 to about 25 weight percent of a crosslinked portion. This process is as indicated herein and specifically comprises in embodiments (1) mixing a monomer or comonomers with a conductive filler with the ratio of monomer or comonomers to conductive filler being from about 10/1 to about 1/1, a redox initiator pair comprised of an oxidizing agent and a reducing agent such that the ratio of the oxidizing agent and reducing agent are preferably in the range of about 0.01/1 to about 100/1, and more preferably range from about 0.05/1 to about 20/1, and wherein the ratio of monomer or comonomers to redox initiator is from about 20/1 to about 1000/1; at least one other free radical polymerization initiator with the ratio of monomer or comonomers to initiator being from about 100/2 to about 100/20, optionally a chain transfer component with the ratio of monomer or comonomers to the chain transfer component being from about 100/0.01 to about 100/1 and optionally a crosslinking component with the ratio of monomer or comonomers to the crosslinking component being from about 100/0.01 to about 100/5, and more preferably 100/.1 to 100/1; (2) effecting bulk polymerization at low temperatures of, for example, from about 0° to about 70° C. and preferably from about 0° to about 30° C. until from about 4 to about 50 weight percent of monomer or comonomers has been converted to polymer with a number average molecular weight of from about 3,000 to about 50,000 and a weight average molecular weight of from about 5,000 to about 40,000, and one or both components of the redox initiator pair have been consumed; (3) dispersing the resulting organic phase from about 2 to about 5 times its volume in water containing from about 1 to about 5 weight percent of a stabilizing component, preferably polyvinylalcohol having a weight average molecular weight of from about 1,000 to about 10,000 to form a suspension of particles with a particle size diameter of from 0.1 to about 1.0 micron by using high shear mixer; (4) transferring the resulting suspension to a reactor and polymerizing the suspension by increasing its temperature to from about 45° C. to about 120° C. to allow the complete conversion of monomer or comonomers to polymer; (5) washing the resulting product with equal volumes of methanol and/or water from about 3 to about 5 times; (6) separating polymeric particles from the water/methanol by means of filtration or centrifugation; and (7) drying of the polymeric particles. Optionally, the conductive component can be added to the organic phase after the bulk polymerization.

Illustrative examples of monomer or comonomers selected in an amount of, for example, from about 80 to about 99 weight percent, and preferably from about 80 to about 90 weight percent include vinyl monomers comprised of styrene and its derivatives such as styrene, α-methylstyrene, p-chlorostyrene and the like; monocarboxylic acids and their derivatives such as acrylic acid, methyl acrylate, ethyl acrylate, butyl acrylate, dodecyl acrylate, octyl acrylate, phenyl acrylate, methacrylic acids, methyl methacrylate, ethyl methacrylate, butyl methacrylate, octyl methacrylate, acrylonitrile and acrylamide; dicarboxylic acids having a double bond and their derivatives such as maleic acid, monobutyl maleate, dibutylmaleate; vinyl esters such as vinyl chloride, vinyl acetate and vinyl benzoate; vinyl ketones such as vinyl methyl ketone and vinyl ether ketone; and vinyl ethyl ether and vinyl isobutyl ether; vinyl naphthalene; unsaturated mono-olefins such as isobutylene and the like; vinylidene halides such as vinylidene chloride and the like; N-vinyl compounds such as N-vinyl pyrrole and fluorinated monomers such as pentafluoro styrene, allyl pentafluorobenzene and the like; and mixtures thereof.

Illustrative examples of at least one other, preferably 1, and generally, for example, about 1 to 10 and 1 to 3, polymerization initiators selected in an amount of, for example, from about 0.1 to about 20 weight percent of monomer, and more preferably from about 1 to about 5 weight percent include azo compounds such as 2,2'-azodimethylvaleronitrile, 2,2'-azoisobutyronitrile, azobiscyclohexanenitrile, 2-methylbutyronitrile and the like, and peroxide such as benzoyl peroxide, lauroyl peroxide, 1-1-(t-butylperoxy)-3,3,5-trimethylcyclohexan, n-butyl- 4,4-di-(t-butylperoxy)valerate, dicumyl peroxide and the like.

Illustrative examples of redox initiator pairs comprised of one oxidizing agent like a peroxide, and one reducing agent like an amine, which are present in a ratio of oxidizing agent:reducing agent of from 0.01:1 to 100: 1, and preferably 0.05/1 to 20/1, and selected in an amount of, for example, from about 0.01 to about 5 weight percent of monomer, and more preferably from about 0.1 to about 3 weight percent include benzoyl peroxide amines such as triethylamine, diethylamine, dimethylamine, anilines such as dimethylaniline and diethylaniline, carbon blacks such as acetylene black, available from Chevron Chemical, VULCAN BLACK™, BLACK PEARL L®, KETJEN BLACK EC600JD®, available from AKZ0, and CONDUCTEX SC ULTRA™, available from Columbian Chemical, and specifically benzoyl peroxide/dimethylaniline, benzoyl peroxide/diethylaniline, lauroyl peroxide/dimethylaniline, lauroyl peroxide/diethylaniline, dicumyl peroxide/dimethylaniline, dicumyl peroxide/diethylaniline and the like, and, for example, peroxides with carbon blacks such as acetylene black, available from Chevron Chemical, VULCAN BLACK™, BLACK PEARL L®, KETJEN BLACK EC600JD®, available from AKZ0, and CONDUCTEX SC ULTRA™, available from Columbian Chemical where the carbon black is present in a concentration of about 1 to 50 weight percent having reducing agent functionalities on their surface.

Crosslinkers, which can be selected to increase the molecular weight of the final polymer product, are known and can be comprised of compounds having two or more polymerizable double bonds. Examples of such compounds include aromatic divinyl compounds such as divinylbenzene and divinylnaphthalene; carboxylic acid esters having two double bounds such as ethylene glycol diacrylate, ethylene glycol dimethylacrylate and the like; and divinyl compounds such as divinyl ether, divinyl sulfite, divinyl sulfone and the like. Of these, divinylbenzene is particularly useful. The crosslinking component is preferably selected in an amount of from about 0.1 to about 5 parts by weight in 100 parts and, more preferably, from 0.2 to 1 part by weight of the monomer or comonomers.

Examples of conductive fillers present in effective amounts, for example, from about 1 to 50 weight percent and more preferably from 5 to 30 weight percent, and which amounts can in embodiments be based on (1) how much filler is needed for minimum effect on conductivity, and (2) achieving a conductivity plateau, include conductive carbon blacks such as acetylene black, available from Chevron Chemical, VULCAN BLACK®, BLACK PEARL L®, KETJENBLACK EC600JD®, available from AKZ0, CONDUCTEX SC ULTRA™, available from Columbian Chemical, metal oxides such as iron oxides, TiO, $SnO_2$, metal powders such as iron powder, and the like.

Stabilizers selected in an amount of, for example, from about 0.1 to about 5 weight percent and, more preferably, from 1 to 4 weight percent of water are selected from the group consisting of nonionic and ionic water soluble polymeric stabilizers such as methyl cellulose, ethyl cellulose, hydroxypropyl cellulose, block copolymer such as PLURONIC E87™ available from BASF, the sodium salt of carboxyl methyl cellulose, polyacrylate acids and their salts, polyvinyl alcohol, gelatins, starches, gums, alginates, zein, casein and the like; and barrier stabilizers such as tricalcium phosphate, talc, barium sulfate and the like. Polyvinyl alcohol with a weight average molecular weight of from about 1,000 to about 10,000 is particularly useful.

Chain transfer components selected, which primarily function to control molecular weight by inhibiting chain growth, include mercaptans such as laurylmercaptan, butylmercaptan and the like, or halogenated carbons such as carbon tetrachloride or carbon tetrabromide, and the like. The chain transfer agent is preferably present in an amount of from about 0.01 to about 1 weight percent and more preferably from 0.1 to 0.5 weight percent of monomer or comonomers. Also, any stabilizer present on the surface of the polymeric particles can be washed using an aliphatic alcohol such as, for example, methanol and the like, or water. Separation of the washed particles from solution can be achieved by various classical separation techniques, such as filtration, centrifugation and the like. Known drying techniques, such as vacuum drying, freeze drying, spray drying, fluid bed drying and the like, can be selected for drying of the polymeric particles.

Illustrative specific examples of polymer or copolymers obtained and selected as a carrier coating in an amount of about 50 to about 99 weight percent, preferably from 70 to 95 weight percent, and in embodiments containing, for example, both a linear and a crosslinked portion in which the ratio of crosslinked portion to linear portion is from about 0.001 to about 0.25 and the number and weight average molecular weight of the linear portion is from about 3,000 to about 500,000 and from about 5,000 to about 2,000,000, respectively, include vinyl polymers of polystyrene and its copolymers, polymethylmethacrylate and its copolymers, unsaturated polymers or copolymers such as styrene-butadiene copolymers, fluorinated polymers or copolymers such as polypentafluorostyrene, polyallylpentafluorobenzene and the like.

The particles of the present invention can be selected as carrier powder coatings, which carriers contain, for example, a steel core, and can be admixed with toner compositions comprised of resin particles, pigment particles and optional additives, such as charge control components, reference U.S. Pat. No. 4,560,635, the disclosure of which is totally incorporated herein by reference, enabling the formation of a developer composition useful in electrophotographic imaging and printing processes.

The following Examples are being submitted to further define various species of the present invention. These Examples are intended to be illustrative only and are not intended to limit the scope of the present invention. Also, parts and percentages are by weight unless otherwise indicated.

EXAMPLE I

REGAL 330® carbon black (82 grams) was dispersed in 510 grams of methyl methacrylate monomer with 40 grams of 2,2'-azobis(2,4dimethylvaleronitrile), 5.0 grams of lauroyl peroxide and 3.0 grams of divinylbenzene crosslinking agent. The redox pair comprised lauroyl peroxide (oxidizing agent) and carbon black (reducing agent) with 2,2'-azobis(2,4-dimethylvaleronitrile) as the additional initiator. This mixture referred to the organic phase was partially bulk polymerized by heating to 25° C. for two hours at which time 13.0 weight percent of the monomer had been converted to polymer as determined by gravimetry, and then the mixture was cooled to 10° C. The resulting organic phase was then mixed with 2,200 milliliters of water containing four weight percent of polyvinyl alcohol (weight average molecular weight of 3,000) and vigorously stirred with a rotator-stator homogenizer at 10,000 rpm for 5 minutes to produce a microsuspension of polymeric particles in water. The suspension polymerization temperature was raised to 60° C. for 2 hours, and then to 85° C. for 1 hour. This mixture was then cooled and filtered. The microsuspension product was washed in 5 liters of methanol. A second wash was accomplished with methanol/water (50:50 ratio) and a third wash was accomplished with deionized water. After the final wash, the product was freeze dried at a temperature of −60° C. Using a scanning electron microscope (SEM), photomicrographs of the dry product showed the average particle size of the polymethylmethacrylate polymer product having a $M_n$ of 245,000 and a $M_w$ of 2,300,000 to be 0.8 micron with a glass transition temperature of 113° C. as measured by DSC. Evaluation showed the powder product conductivity was $10^{-2}$ (ohm-cm)$^{-1}$, as determined by measuring the electrical resistance of a pressed powder pellet. 0.7 Gram of the resulting polymethyl methacrylate particles containing carbon black were mixed with 100 grams of Hoeganoes steel core carrier with an average bead diameter of 90 microns in a Munson type mixer at room temperature about 25° C. The coated polymer was then fused on the surface of the carrier at 350° F. in a rotary kiln furnace. The coated carrier was then cooled and sieved. The sieved products were scanned for surface coverage using the SEM. The results evidenced 100 percent surface coverage of polymer. A functional evaluation of the resulting carrier in the Xerox Corporation 5100 two component development system indicated it had a triboelectric charge (tribo) of 25 microcoulombs per gram (μc/g) and a conductivity of $10^{-7}$ (ohm-cm)$^{-1}$ as determined by the Faraday Cage method. Thermal gravimetric analysis evidenced that the carbon black content was 12.7 weight percent, indicating all the carbon black remained in the interior of the particles, and that there was no free carbon black.

This experiment was repeated five times, and it was calculated that the mean conversion for the conversion at the end of the bulk polymerization was 0.127 with a standard deviation of 0.007.

EXAMPLE II

The process of Example I was repeated except that the process was accomplished with ten times the quantity of each reagent. REGAL 330® carbon black (820 grams) was dispersed in 5,100 grams of methyl methacrylate monomer with 400 grams of 2,2'-azobis(2,4-dimethylvaleronitrile), 50.0 grams of lauroyl peroxide and 30.0 grams of divinylbenzene crosslinking agent. The resulting organic phase was partially bulk polymerized by heating to 25° C. for two hours at which time 12.8 weight percent of the monomer had been converted to polymer as determined by gravimetry. In comparison, the conversion at the smaller scale was 13.0 percent, indicating no significant difference in polymerization rate with scaleup of the reaction.

EXAMPLE III

Methyl methacrylate monomer (100 grams) was mixed with 2 grams of 2,2'-azobis(2,4-dimethylvaleronitrile) initiator, and 1 gram of the redox initiator pair benzoyl peroxide/dimethylaniline where the ratio of benzoyl peroxide/dimethylaniline was 5:1, and 3.0 grams of divinylbenzene crosslinking agent. This organic phase was partially bulk polymerized by heating to 25° C. for two hours at which time 24.4 weight percent of the monomer had been converted to polymer as determined by gravimetry, and then cooled to 10° C. This organic phase was then mixed with 16 grams of Conductex SC Ultra carbon black, and the resulting mixture was dispersed in 2,200 milliliters of water containing four weight percent of polyvinyl alcohol (weight average molecular weight of 3,000) and vigorously stirred at 10,000 rpm for 5 minutes to produce a microsuspension of polymeric particles in water. The suspension polymerization temperature was increased to 60° C. for 2 hours, and then to 85° C. for 1 hour. This mixture was then cooled and filtered. The microsuspension product was washed in 5 liters of methanol. A second wash was accomplished with methanol/water (50:50 ratio) and a third wash was accomplished with deionized water. After the final wash, the product was freeze dried. The polymethylmethacrylate polymer product with a $M_n$ of 225,000 and a $M_w$ of 2,200,000 had properties that were essentially the same as those of the product described in Example I.

This Example was repeated five separate times, and it was calculated that the mean conversion for the conversion at the end of the bulk polymerization was 0.127 with a standard deviation of 0.005.

EXAMPLE IV

Example III was repeated except that the ratio of benzoyl peroxide to dimethylaniline was 10:1. The conversion at the end of the bulk polymerization (2 hours) was 15.1 percent. The polymethylmethacrylate product with $M_n$ of 240,000 and $M_w$ of 2,250,000 had properties that were essentially the same as those of the product described in Example I.

EXAMPLE V

Example IV was repeated except that the monomer used was styrene and the bulk polymerization was allowed to proceed for 3 hours. The conversion at the end of the built polymerization was 8.2. The polystyrene product had a $M_n$ of 86,000 and a $M_w$ of 350,000. The mean diameter was 0.6 micron with a glass transition temperature of 102° C. as measured by DSC. Evaluation showed the powder product conductivity was $10^{-3}$ (ohm-cm)$^{-1}$ as determined by measuring the electrical resistance of a pressed powder pellet. 0.7 Gram of the resulting polystyrene particles containing carbon black was mixed with 100 grams of Hoeganoes steel with an average bead diameter of 90 microns in a Munson type mixer at room temperature. The coated polymer was then fused on the surface of the carrier core at 350° F. in a rotary kiln furnace. The coated carrier was then cooled and sieved. The sieved carrier particles were scanned for surface coverage using SEM. The results evidenced 100 percent surface coverage of polymer. A functional evaluation of the resulting carrier in the Xerox Corporation 5100 two component development system indicated it had a triboelectric charge (tribo) of 12 microcoulombs per gram (μc/g) and a conductivity of $10^{-8}$ (ohm-cm)$^{-1}$ as determined by the Faraday Cage method.

COMPARATIVE EXAMPLE 1

An experiment similar to Example I was conducted using the process disclosed in U.S. Pat. No. 5,236,629. REGAL 330® carbon black (82 grams) was dispersed in 510 grams of methyl methacrylate monomer with 40 grams of 2,2'-azobis(2,4-dimethylvaleronitrile), 16.0 grams of benzoyl peroxide and 3.0 grams of divinylbenzene crosslinking agent. The resulting organic phase was partially bulk polymerized by heating to 45° C. for 90 minutes until 12.4 weight percent of the monomer had been converted to polymer, and then cooled to 10° C. The resulting mixture was then mixed with 2,200 milliliters of water containing four weight percent polyvinyl alcohol (molecular weight $M_w$ of 3,000) and vigorously stirred at 10,000 rpm for 5 minutes. The suspension polymerization temperature was increased to 60° C. for 2 hours, and then to 85° C. for 1 hour. The microsuspension polymethylmethacrylate product was washed and dried as in Example I. $M_n$ was measured to be 215,000 and $M_w$ 2,100,000. Using a scanning electron microscope (SEM), photomicrographs of the dry product indicated the average particle size of the particles was 0.9 micron with a glass transition temperature of 115° C. as measured by DSC. Evaluation showed the powder product conductivity was $10^{-2}$ (ohm-cm)$^{-1}$, as determined by measuring the electrical resistance of a pressed powder pellet. 0.7 Gram of the resulting polymethyl methacrylate particles containing carbon black was mixed with 100 grams of Hoeganoes steel carrier with an average bead diameter of 90 microns in a Munson type mixer at room temperature. The coated polymer was then fused on the surface of the carrier at 350° F. in a rotary kiln furnace. The coated carrier was then cooled and sieved. The sieved materials were scanned for surface coverage using the SEM. The results evidenced 100 percent surface coverage of polymer. A functional evaluation of the resulting carrier in the Xerox Corporation 5100 two component development system indicated it had a triboelectric charge (tribo) of 23 microcoulombs per gram (μc/g) and a conductivity of $10^{-7}$ (ohm-cm)$^{-1}$ as determined by the Faraday Cage method.

This experiment was repeated five times, and it was calculated that the mean conversion for the conversion at the end of the bulk polymerization was 0.121 with a standard deviation of 0.033. In comparison with the process described in Example I, it is apparent that this process has significantly greater variability in the conversion at the end of the bulk polymerization. As shown in U.S. Pat. No. 5,236,629, the viscosity and, therefore, the fraction of monomer polymerized during the bulk polymerization are important parameters in determining the final product properties.

COMPARATIVE EXAMPLE 2

The process of Comparative Example 1 was repeated except that the process was accomplished with ten times the quantity of all of the reactant reagents. The organic phase was partially bulk polymerized by heating to 45° C. for 90 minutes at which time the conversion was 19.3 percent. In comparison the conversion at the smaller scale was 12.4 percent, indicating a significant difference in polymerization rate with scale.

Other modifications of the present invention may occur to those skilled in the art subsequent to a review of the present application. The aforementioned modifications, including equivalents thereof, are intended to be included within the scope of the present invention.

What is claimed is:

1. A process for the preparation of polymer which comprises effecting a bulk polymerization of a mixture containing about 50 to about 99 percent of at least one monomer, about 0.01 to about 1 percent of a chain transfer agent, about 0.1 to about 5 percent of a crosslinking agent, about 1 to about 50 percent of a conductive additive, about 0.1 to about 3 percent of a free radical redox polymerization initiator pair, and about 0.1 to about 5 percent of at least one additional other initiator until from about 4 to about 50 weight percent of the monomer has been polymerized and one or both components in the the redox initiator pair has been consumed; dispersing with a high shear mixer, at about 1,000 to about 20,000 rpm, 100 parts of the aforementioned partially polymerized mixture in about 200 to about 500 parts water containing about 0.01 to about 10 percent of a stabilizing component selected from the group consisting of nonionic and ionic water soluble polymeric stabilizers to obtain a suspension of particles; polymerizing the resulting suspension by heating to between about 45° to about 120° C.; and optionally subsequently isolating, washing and drying the polymer additive product, and wherein said redox polymerization initiator pair is comprised of a peroxide oxidizing agent, and a reducing agent wherein the oxidizing agent is benzoyl peroxide, lauroyl peroxide, 1-1-(t-butylperoxy)-3,3,5-trimethylcyclohexane, n-butyl-4,4-di-(t-butylperoxy)valerate, or dicumyl peroxide, and wherein the reducing agent is the amine triethylamine, or diethylamine, is the aniline dimethylaniline, or diethylaniline, or is carbon black with a reducing agent on its surface.

2. A process for the preparation of conductive polymer particles which comprises effecting at a low temperature heating of between 0° to about 70° C. bulk polymerization of a mixture of at least one monomer, a conductive filler, free radical redox polymerization initiator pair components, and at from about 1 to 10 weight percent other free radical initiator, or initiators until from about 4 to about 50 weight percent of the monomer has been polymerized and one or both components in the the redox initiator pair has been consumed; optionally adding additional free radical initiator, which is the same as or different from said other free radical initiator; dispersing with a high shear mixer the aforementioned partially polymerized mixture in water containing a stabilizing component selected from the group consisting of nonionic and ionic water soluble polymeric stabilizers to obtain a suspension of particles with an average diameter of from about 0.05 to about 5 microns; polymerizing the resulting suspension to form polymer the conductive particles; and subsequently optionally isolating, washing and drying the conductive polymer particles, and wherein said redox polymerization initiator pair is comprised of a peroxide oxidizing agent, and a reducing agent wherein the oxidizing agent is benzoyl peroxide, lauroyl peroxide, 1-1-(t-butylperoxy)-3,3,5-trimethylcyclohexane, n-butyl- 4,4-di-(t-butylperoxy)valerate, or dicumyl peroxide, and wherein the reducing agent is the amine triethylamine, or diethylamine, is the aniline dimethylaniline, or diethylaniline, or is carbon black with a reducing agent on its surface.

3. A process in accordance with claim 2 wherein a mixture of monomers is selected and the low temperature is from about 0° to about 30° C.

4. A process in accordance with claim 3 wherein the mixture contains from 2 monomers to about 20 monomers.

5. A process in accordance with claim 2 wherein polymerizing the resulting suspension is accomplished by heating.

6. A process in accordance with claim 1 wherein washing is accomplished with water and/or mixtures of water and alcohols by centrifugation or filtration, and drying is accomplished by freeze drying, fluidized bed drying or vacuum drying.

7. A process in accordance with claim 5 wherein heating is accomplished at a temperature of from about 30° C. to about 200° C.

8. A process in accordance with claim 5 wherein heating is accomplished at a temperature of from about 45° C. to about 120° C.

9. A process in accordance with claim 2 wherein the number average molecular weight of the polymer is from between about 3,000 to about 500,000, and the weight average molecular weight of the polymer is from between about 5,000 to about 2,000,000.

10. A process in accordance with claim 1 wherein from 1 to 3 additional other initiators are selected.

11. A process in accordance with claim 2 wherein the conductive polymer particles obtained have an average particle diameter of from about 0.05 micron to about 5 microns.

12. A process in accordance with claim 2 wherein the weight percentage of conductive filler in the conductive polymer particles is from about 1 to about 50.

13. A process in accordance with claim 2 wherein the conductive filler is evenly distributed throughout the polymer matrix of the conductive polymer particles.

14. A process in accordance with claim 2 wherein the conductivity of the conductive polymer particles is from about $10^{-10}$ to about $10^{-1}$ (ohm-cm)$^{-1}$ as determined by measuring the electrical resistivity of a pressed pellet.

15. A process in accordance with claim 2 wherein the triboelectrical charge of the conductive polymer particles is from about +40 to about −40 microcoulombs per gram.

16. A process in accordance with claim 2 wherein the monomer is selected from the group consisting of α-methylstyrene, p-chlorostyrene, monocarboxylic acids and the derivatives thereof; dicarboxylic acids with a double bond and their derivatives; vinyl ketones; vinyl naphthalene; unsaturated mono-olefins; vinylidene halides; N-vinyl compounds; fluorinated vinyl compounds and mixtures thereof.

17. A process in accordance with claim 2 wherein the monomer is selected from the group consisting of acrylic acid, methyl acrylate, ethyl acrylate, butyl acrylate, dodecyl acrylate, octyl acrylate, phenyl acrylate, methacrylic acids, methyl methacrylate, ethyl methacrylate, butyl methacrylate, octyl methacrylate, acrylonitrile and acrylamide; maleic acid, monobutyl maleate, dibutyl maleate; vinyl chloride, vinyl acetate, vinyl benzoate; vinylidene chloride, pentafluoro styrene allyl pentafluorobenzene and N-vinyl pyrrole.

18. A process in accordance with claim 2 wherein the conductive filler is selected from the group consisting of conductive carbon blacks, metal oxides, metals, and mixtures thereof.

19. A process in accordance with claim 2 wherein the conductive filler is selected from the group consisting of acetylene black, VULCAN BLACK®, BLACK PEARLS L®, CONDUCTEX SC ULTRA BLACK®, CONDUCTEX 975 BLACK®, KETJENBLACK®, REGAL 330®, RAVEN 5250®, RAVEN 5750®, iron oxides, titanium oxides, tin oxides, and iron powder.

20. A process in accordance with claim 2 wherein the other free radical initiator is selected from the group consisting of azo compounds and peroxides.

21. A process in accordance with claim 20 wherein the other free radical polymerization initiator is benzoyl peroxide, lauroyl peroxide, 1-1-(t-butylperoxy)-3,3,5-trimethylcyclohexane, n-butyl- 4,4-di-(t-butylperoxy)valerate, dicumyl peroxide, 2,2'-azodimethylvaleronitrile, 2,2'-azoisobutyronitrile, azobiscyclohexanenitrile, or 2-methylbutyronitrile.

22. A process in accordance with claim 2 wherein the other free radical initiator is a peroxide selected in a concentration of from about 0.01 to about 5 weight percent.

23. A process in accordance with claim 2 wherein the redox initiator pair is comprised of an oxidizing agent and a reducing agent, and wherein the amount of said pair is from about 0.1 to about 3 weight percent such that the ratio of oxidizing agent to reducing agent is from about 0.01:1 to about 100:1.

24. A process in accordance with claim 23 wherein the ratio selected is from about 10:1 to about 50:1.

25. A process in accordance with claim 2 wherein the redox initiator pair is comprised of an oxidizing agent and a reducing agent, and is present in a concentration of from about 0.1 to about 3 weight percent, and the ratio of oxidizing agent to reducing agent is from about 0.01:1 to 100:1.

26. A process in accordance with claim 25 wherein the oxidizing agent is a peroxide, and the reducing agent is an amine, an aniline, or a carbon black with a reducing agent on the surface thereof.

27. A process for the preparation of polymer which comprises effecting a bulk polymerization of a mixture containing at least one monomer, a chain transfer agent a crosslinking agent, a carbon black filler additive, a free radical redox polymerization initiator pair, and a third free radical initiator until from about 4 to about 50 weight percent of the monomer has been polymerized and one or both components in the redox initiator pair has been consumed; optionally adding additional free radical initiator; which is the same as or different from said third free radical initiator; dispersing with a high shear mixer the aforementioned partially polymerized mixture in water containing a stabilizing component selected from the group consisting of nonionic and ionic water soluble polymeric stabilizers to obtain a suspension of particles; polymerizing the resulting suspension; and subsequently isolating, washing and drying the polymer carbon black product; and wherein said carbon black is dispersed in said polymer, and wherein said redox polymerization initiator pair is comprised of a peroxide oxidizing agent, and a reducing agent wherein the oxidizing agent is benzoyl peroxide, lauroyl peroxide, 1-1-(t-butylperoxy)-3,3,5-trimethylcyclohexane, n-butyl- 4,4-di-(t-butylperoxy)valerate, or dicumyl peroxide, and wherein the reducing agent is the amine triethylamine, or diethylamine, is the aniline dimethylaniline, or diethylaniline, or is carbon black with a reducing agent on its surface.

28. A process in accordance with claim 23 wherein the redox initiator pair is comprised of an oxidizing agent and a reducing agent, and wherein the amount of said pair is from about 0.1 to about 3 weight percent such that the ratio of oxidizing agent to reducing agent is from about 0.05:1 to about 20:1.

* * * * *